Dec. 10, 1929.　　　F. SPORER　　　1,739,267

APPARATUS FOR COLLECTING BRONZE DUST FROM STAMPING MILLS

Filed Jan. 28, 1926

INVENTOR

Friedr. Sporer

Patented Dec. 10, 1929

1,739,267

UNITED STATES PATENT OFFICE

FRIEDRICH SPORER, OF NUREMBERG, GERMANY

APPARATUS FOR COLLECTING BRONZE DUST FROM STAMPING MILLS

Application filed January 28, 1926, Serial No. 84,417, and in Germany April 20, 1925.

In the bronze stamping mills of known type with arrangements for sucking off the bronze dust from the stamping chamber and with pressure conduit for conducting the sucked off bronze dust through a collecting box, the finest bronze dust drawn along is returned from the collecting box into the stamping chamber. From the excessive pulverization resulting from the repeated stamping heating of this finest bronze particles is produced and consequently the production of annealing colours which impair the fine gloss of the stamping material. This finest bronze dust, which is repeatedly returned into the stamping chamber filters through the narrowest gaps produced by wearing around the ram rods, so that it is inhaled by the workmen.

According to the invention the impairing of the quality of the product and the danger to the health of the workmen are avoided by catching the finest bronze dust drawn along from the connecting box in a separate dust box which is connected with the end of a pressure conduit by means of a removable hood of a material which is permeable to the air but not to the bronze dust.

An embodiment of the invention is shown, by way of example, in the accompanying drawing in which:—

Figure 1:
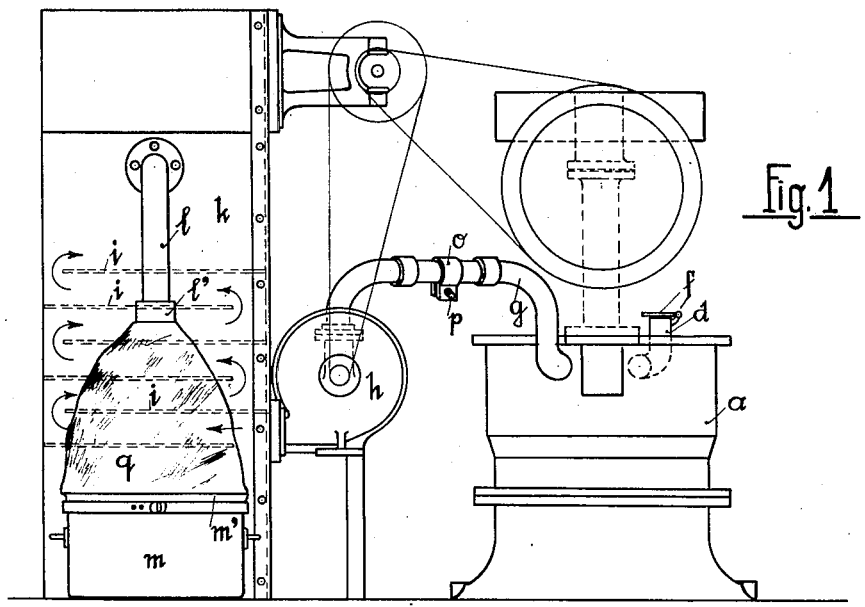
Fig. 1 shows the improved bronze stamping mill in elevation.
Figure 2:
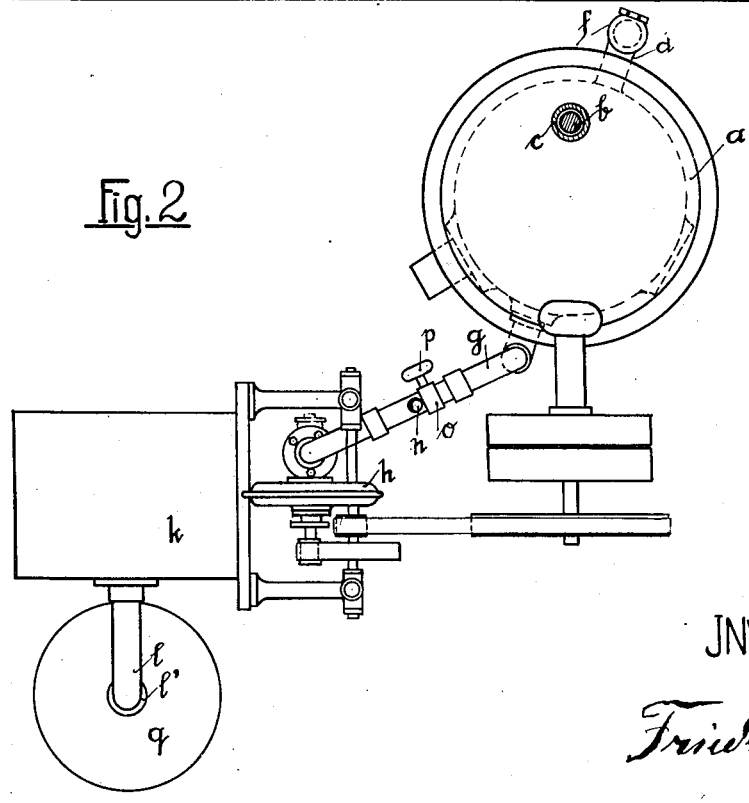
Fig. 2 is a plan view of the same.

In the drawing, $a$ designates a stamping chamber in which rams (not shown) are arranged in the form of a circle and work in the well known manner. The rod $b$ of each of the said rams is guided in a bushing $c$. An air inlet tube $d$, which is connected with the stamping chamber $a$ is closed by a flap $f$. Opposite the air inlet $d$ is a suction conduit $g$ extending from the stamping chamber to a blower $h$. In the suction conduit $g$ is an air hole $n$ adapted to be completely closed by means of a clip $o$ which is tightly fixed around the suction pipe $g$ by means of a thumb nut $p$.

After the operation of stamping the material has been completed, air is sucked into the stamping chamber $a$ through the open air inlet $d$ by means of the blower $h$. The air and the bronze dust are drawn from the stamping chamber $a$ through the suction conduit $g$ by the blower $h$, which causes the bronze dust to travel in a serpentine course over settling surfaces $i$ in a collecting box $k$.

According to the invention a removable hood $q$ is dust tightly fixed on the end $l'$ of the pressure conduit $l$ connected with the upper end of the collecting box $k$, said hood being made from a material which is permeable to the air but retains even the finest dust particles, for instance fustian, said hood being adjustably fixed on the edge $m'$ of a dust pot $m$.

As long as the stamping material has not yet reached the desired degree of fineness, the air hole $n$ in the suction pipe $g$ remains open, the blower $h$ being permanently operated. The flap $f$ of the air inlet $d$ is closed. The blower $h$ is of such a size that it has the tendency to suck in more air than can flow in through the hole $n$ alone. In the stamping chamber $a$ a sucking action is consequently produced, which although not being strong enough to draw along bronze powder is sufficient to produce a feeble air current in the direction into the stamping chamber between the ram rods and the guide bushings $c$ which are not constructed like stuffing boxes. These air currents blow back the bronze dust which has the tendency to escape through the annular gaps produced, after a short time of service, and retains this dust in the stamping chamber.

If the bronze powder is fine enough for sifting the air inlet flap $f$ is opened and the hole $n$ in the suction pipe is closed by the clip $o$. The air current which flows now with sufficient sucking force through the stamping chamber $a$ draws the bronze powder into the blower $h$, from where it is forced into the collecting box $k$ fitted with suitable depositing devices. The fine bronze dust drawn along from the collecting box flows through the pressure pipe $l$ and the filtering hood $q$ into the dust pot $m$, as the material of which the hood is made, is impermeable to the dust but not to the compressed air.

I claim:—

A dust collector for bronze stamping mills including a collecting box for the bronze dust, a collector pot for the finest bronze dust freely arranged behind said collecting box, a hood-shaped filter adapted to cover air tight said collector pot and made of a material permeable to the air but impervious to the finest particles of bronze dust, a conduit connecting said hood-shaped filter with the said collecting box and adapted to freely hold said hood shaped filter, a blower discharging into said collecting box, a suction conduit for said blower, and an adjustable atmospheric vent on said suction conduit adapted to regulate the air stream and the amount of bronze dust to be withdrawn by said air stream.

In testimony whereof I affix my signature.

FRIEDRICH SPORER.